United States Patent [19]
Smith

[11] Patent Number: 4,534,021
[45] Date of Patent: Aug. 6, 1985

[54] ANGULARLY MULTIPLEXED OPTICAL RECORDING MEDIUM

[75] Inventor: William V. Smith, Irvine, Calif.

[73] Assignee: Discovision Associates, Costa Mesa, Calif.

[21] Appl. No.: 329,374

[22] Filed: Dec. 10, 1981

[51] Int. Cl.$^3$ .............................................. G11B 7/00
[52] U.S. Cl. ...................................... 369/47; 369/109; 369/111; 369/119; 369/275; 358/342
[58] Field of Search ............................. 369/18, 44–47, 369/52, 93, 109–111, 118–119, 275; 358/342

[56] References Cited

U.S. PATENT DOCUMENTS

| | | |
|---|---|---|
| 3,235,672 | 2/1966 | Begain . |
| 3,513,268 | 5/1970 | John, Jr. . |
| 3,530,258 | 9/1970 | Gregg . |
| 3,764,759 | 10/1973 | Herriger et al. . |
| 3,893,129 | 7/1975 | Endo et al. . |
| 3,913,076 | 10/1975 | Lehureau et al. . |
| 3,919,465 | 11/1975 | Adler et al. . |
| 3,992,593 | 11/1976 | Heine . |
| 4,142,098 | 2/1979 | Korpel . |
| 4,152,586 | 5/1979 | Elliott et al. . |
| 4,193,090 | 3/1980 | Korpel . |
| 4,216,357 | 8/1980 | Iwasaki et al. ............... 369/100 |
| 4,310,916 | 11/1982 | Dil ............................ 369/47 |
| 4,325,135 | 4/1982 | Dil et al. ..................... 369/112 |

FOREIGN PATENT DOCUMENTS

| | | |
|---|---|---|
| 0026517 | 8/1981 | European Pat. Off. . |
| 0055439 | 7/1982 | European Pat. Off. . |
| 2652795 | 5/1977 | Fed. Rep. of Germany . |
| WO82/00067 | 1/1982 | PCT Int'l Appl. . |
| 2021281 | 11/1979 | United Kingdom . |
| 2058434 | 4/1981 | United Kingdom . |

OTHER PUBLICATIONS

"Patent Abstracts of Japan", vol. 5, No. 146 (P-80) (818), Sep. 16, 1981.
"Patent Abstracts of Japan", vol. 1, No. 153, Dec. 8, 1977, p. 8161 E 77.
"Electronics and Communications in Japan", vol. 60, No. 7, Jul. 1977, pp. 89–98.

Primary Examiner—Robert L. Richardson
Attorney, Agent, or Firm—Ronald J. Clark

[57] ABSTRACT

An apparatus for optically reading a recording medium having information tracks disposed on alternating inclined recording surfaces preferably arranged in separate but alternately interposed spirals inclined at different angles on the medium. The apparatus includes photodetectors for detecting light reflected from each of the tracks, and circuitry for controllably combining the signals from the photodetectors to minimize crosstalk in the recovered signals.

5 Claims, 15 Drawing Figures

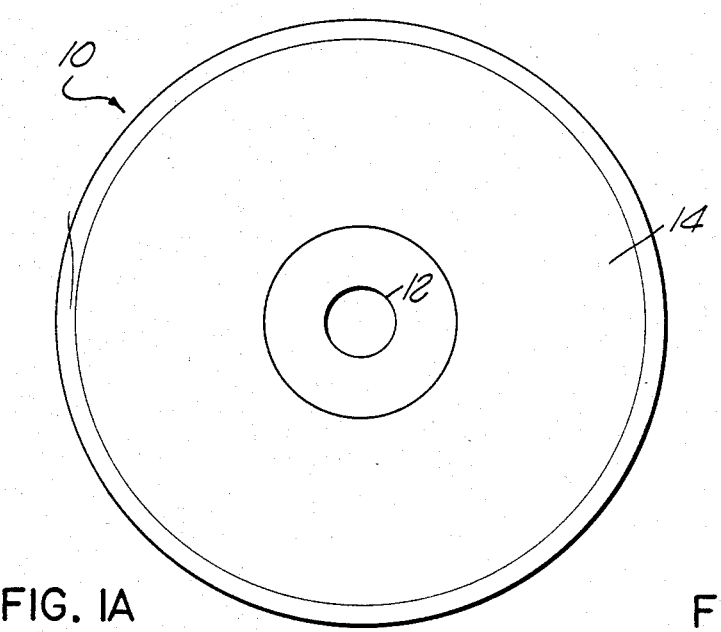
FIG. IA
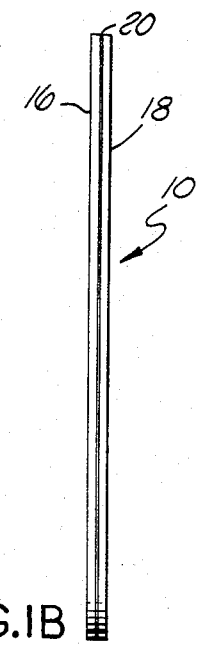
FIG. IB
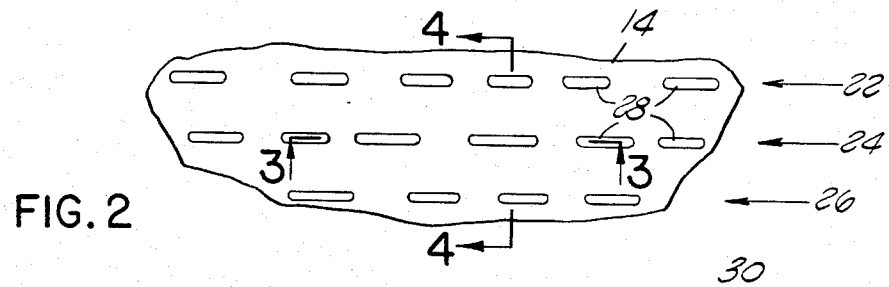
FIG. 2
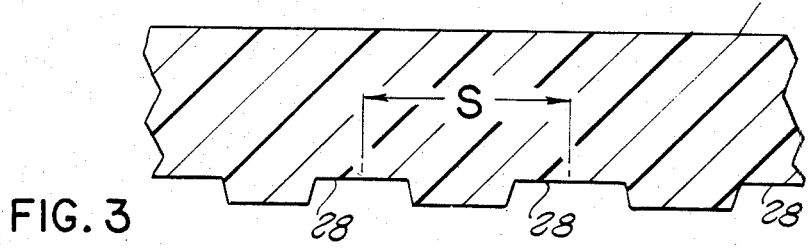
FIG. 3
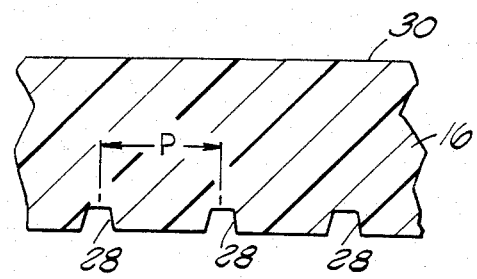
FIG. 4

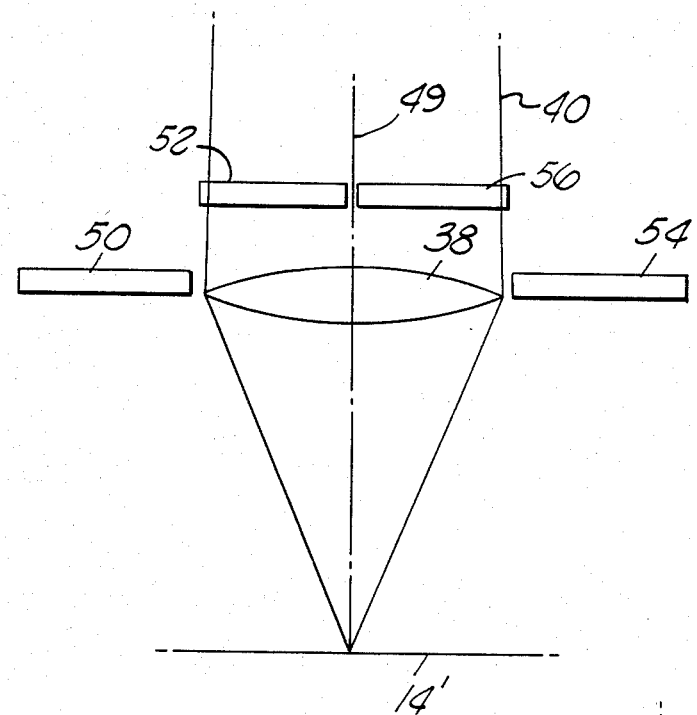
FIG. 11
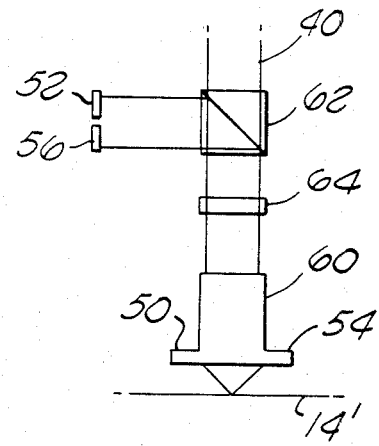
FIG. 12
FIG. 13
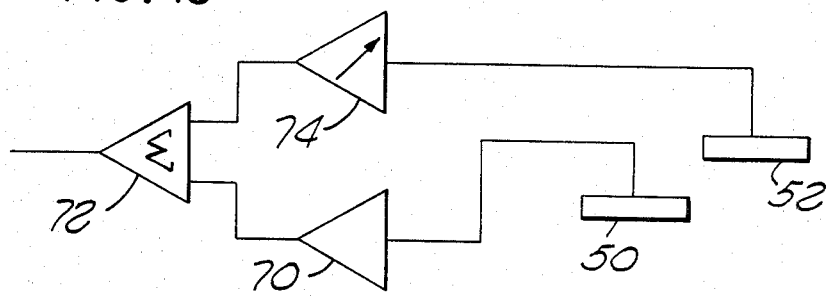

ANGULARLY MULTIPLEXED OPTICAL RECORDING MEDIUM

BACKGROUND OF THE INVENTION

1. Field of the Invention

The present invention relates to the field of information recording media, and more particularly relates to the field of optically readable recording media, such as optical discs.

2. Background Art

An optically readable storage medium is one which can be read by way of a beam of light which is imaged to a small spot on the medium. One common form of optically readable recording medium is the optical disc. Optical discs are in increasing use for the recording and playback of video program information.

The most widespread form of optical disc comprises a flat disc made of two disc-shaped parts of transparent material which are separately constructed and then glued together to form the disc. This two-sided construction permits the disc to carry two sets of stored information, one on each disc part. The disc is flat, circular and approximately the size of an LP phonograph record.

Information is stored on a side of a disc in uniform circular or spiraling tracks of optically readable indicia. The indicia are readable by virtue of exhibiting optical contrast with respect to the surrounding surface in which they are formed. For example, a spot of light imaged onto the recording surface of a disc side at a location where no indicia are present may have most of its light reflected directly back in mirror-like reflection. However, a spot of light imaged onto one of the indicia may be scattered, thus resulting in less light being reflected directly back from the recording surface. By arranging indicia in row-like tracks, a spot of light can be scanned along a track and the variation in the intensity of the light reflected directly back may be detected to extract the information from the disc.

Commercial optical discs generally take a form in which the flat inner surface of each disc part is used as a recording surface in which the tracks of indicia are molded in the form of tiny pits. Since each disc part is read by imaging the spot of light through the disc from the side opposite the recording surface, the tiny pits on the recording surface are presented to the imaged beam of light as a series of bumps.

The amount of information that can be stored on an optical disc depends upon the packing density of the indicia. Consequently, tracks and the indicia within them are spaced as close together as possible. A common distance selected by optical disc manufacturers for track-to-track spacing, for example, is approximately 1.6 microns. This track spacing permits the optical disc to be played while the imaged spot of light scans along the track, wobbling back and forth within the limits of the range of the servo control mechanism of the disc player, while maintaining the influence of adjacent tracks, called "cross-talk", to an acceptable minimum for video program playback. Closer track-to-track spacing in this format has been found to result in a rapidly increasing level of cross-talk to unacceptable levels. In addition, while the level of cross-talk which can be achieved using the format just described is generally considered to provide satisfactory playback performance, it is desired to improve the level of cross-talk suppression even more.

Accordingly, it will be appreciated that there is a need for an improved format for an optically readable recording medium which provides reduced cross-talk between adjacent tracks. In addition, there is a need for an optically readable recording medium which provides improved track-to-track spacing while maintaining acceptable levels of cross-talk between tracks. The present invention satisfies these needs.

SUMMARY OF THE INVENTION

The present invention resides in an optically readable recording medium having angularly multiplexed optical storage. A base of solid material is provided having a recording side. A set of elongate inclined recording surfaces are arrayed on the recording side in a pattern suitable for recording thereon optically readable information. This first set of recording surfaces is commonly inclined at a first predetermined angle with respect to a reference surface which is fixed with respect to the base. A second set of elongate inclined recording surfaces is arrayed on the recording side intermediate the first set of recording surfaces and commonly inclined at a second predetermined angle which is different from the first predetermined angle with respect to the reference surface.

This novel recording medium structure provides significantly improved cross-talk performance as compared with prior art optically readable recording medium structures. According to the present invention, a spot of light for reading the recording medium may be imaged on the first set of recording surfaces and relative motion provided between the base and the source of reading light, causing a scanning of the first set of recording surfaces. The light which emanates from the inclined recording surface, as by reflection and scattering, occupies a roughly conical volume tilted with respect to the central axis of the incident beam of light in the direction of the incline of the recording surface. The light may be detected by a first photodetector located in the vicinity of the emanative cone of light.

After the first set of recording surfaces is scanned, the second set of recording surfaces may then be scanned in the same manner. However, because of the different angle of inclination of the second set of recording surfaces, the emanative cone of light is inclined in a different direction. A second photodetector located in the vicinity of this second cone of light may then detect the light from the second set of recording surfaces. Because of the different angle of inclination between adjacent recording surfaces on the recording medium, any light which "spills over" to adjacent tracks from the reading spot of light results in the production of associated cones of light inclined at a different angle from the cone of light emanating from the track being read. This provides an effective attenuation of the influence of the information recorded on adjacent tracks on the active photodetector, and thereby reduces the level of cross-talk between adjacent tracks in optically readable recording media.

It will be appreciated from the foregoing that the present invention represents a significant advance in the field of optically readable recording media. In particular, the invention provides an improved configuration of optical disc which, by the angular multiplexing of adjacent tracks, provides significantly improved suppression of cross-talk. Other aspects and advantages of the present invention will become apparent from the following more detailed description, taken in conjunction with the accompanying drawings. dr

BRIEF DESCRIPTION OF THE DRAWINGS

FIG. 1A is a plan view of an optical disc.

FIG. 1B is a view of the optical disc of FIG. 1A taken along its edge.

FIG. 2 is an enlarged plan view of a very small section of the information surface of one side of the optical disc shown, in FIG. 1A.

FIG. 3 is a cross-section view through line 3—3 of FIG. 2.

FIG. 4 is a section view through line 4—4 of FIG. 2.

FIG. 11 is an optical diagram illustrating the principles of detection of optical signals generated by an optical disc constructed according to the principles of the present invention.

FIG. 12 is an optical diagram illustrating a practical arrangement for the placement of photodetectors for the reading of an optical disc constructed according to the principles of the present invention.

FIG. 13 is a schematic diagram illustrating an approach to optimization of cross talk suppression according to the present invention.

DETAILED DESCRIPTION OF THE PREFERRED EMBODIMENT

Figure 5:
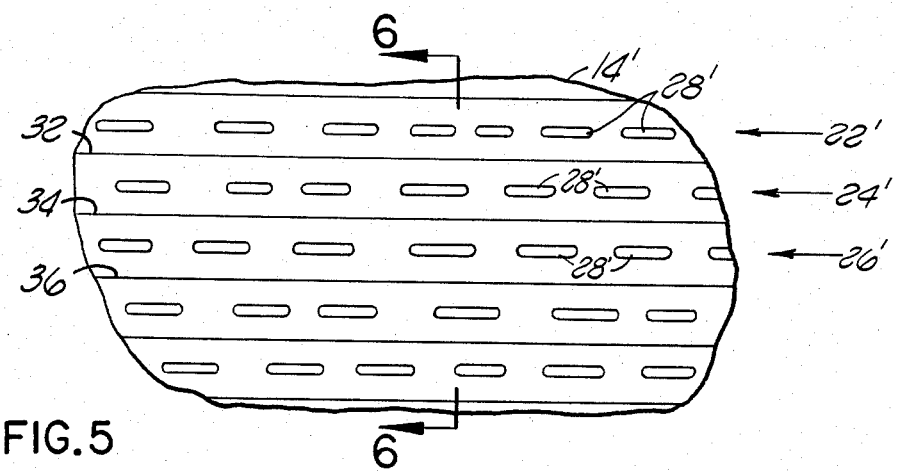
FIG. 5 is an enlarged plan view of a very small section of the information surface of one side of an optical disc constructed according to the principles of the present invention.

FIG. 1A is a plan view of a conventional optical disc used for the recording and playback of video program information. FIG. 1B is an edge view of the disc shown in FIG. 1A. As shown, the disc is circular and flat, approximately the size of an LP phonograph record. The disc has a central apperture 12 through which the spindle of an optical disc player is inserted for the support and rotation of the disc 10. Information is recorded on the disc 10 in an annular area of recording surface 14 having an inner radius somewhat larger than the central apperture 12, and having an outer radius somewhat smaller than the outer radius of the disc 10. The disc is formed from two separate disc parts 16, 18, as can best be seen in FIG. 1B, which are glued together to form a single, two-sided disc. The recording surface 14 can be read by a conventional optical disc player apparatus.

FIG. 2 is a plan view of a tiny section of the recording surface 14 of one part 16 of the optical disc 10 shown in FIGS. 1A and 1B. Three adjacent tracks 22, 24 and 26 of indicia 28 are shown. The indicia 28 are arranged in rows in each track. The length and spatial frequency of the indicia 28 are varied in accordance with the information recorded on the track.

FIG. 3 is a cross-section through line 3—3 of FIG. 2, illustrating the structure of the indicia 28 which make up the information tracks of the optical disc 10. FIG. 4 is a cross-section through line 4—4 of FIG. 2 illustrating a cross-section of the indicia 28 in the direction of their width. Considering FIGS. 2, 3 and 4 together, it can be seen that the indicia 28 comprise long narrow pits in the information surface 14 of the disc side 15. Since the reading spot of light is formed by a beam of light which passes through the disc part 16 from the side 30 opposite the information surface 14, the indicia 28 are presented as a series of bumps to the incident light. As mentioned previously, nominal values for the spacing between indicia along the tracks for commercial video optical discs is approximately 1 micron. Track-to-track spacing, or "pitch", for such discs is approximately 1.6 microns. This track spacing of 1.6 microns represents what has been considered in the industry to be the minimum practical track pitch which provides a level of cross-talk considered acceptable. Optical discs having tracks of indicia of the aforementioned nominal dimensions can have recorded thereon video program information of up to 1 hour per side for discs which are played at a constant linear velocity, and up to ½ hour per side for discs played at a constant angular velocity.

Optical discs constructed according to the preferred embodiment of the present invention appear, in their large features, very similar to the optical disc 10 shown in FIGS. 1A and 1B, discussed above. In fact, such discs have all of the features described in connection with those figures. However, at a microscopic level the recording surfaces of such discs are quite different.

FIG. 5 is a plan view similar to that shown in FIG. 2, of a microscopic portion of the information surface 14' of the preferred embodiment of the present invention. As can be seen, the recording surface 14' is provided with tracks of indicia 28', e.g., 22', 24', 26' which appear similar to the tracks 22, 24, 26, of a conventional optical disc. However, the tracks of indicia are separated by borders, e.g., 32, 34, 36.

Figure 6:
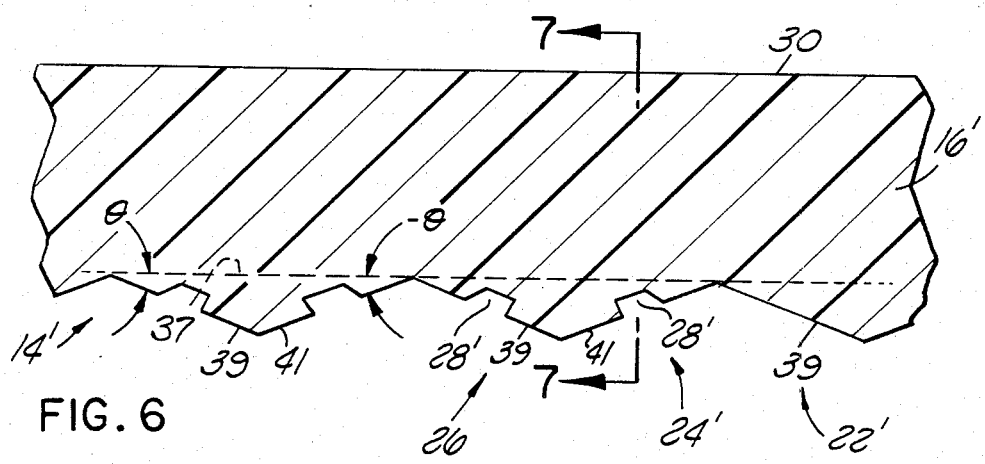
FIG. 6 is a section view through line 6—6 of FIG. 5.

FIG. 6 is a section view through lines 6—6 of FIG. 5 illustrating the configuration of the surface 14' which gives rise to the aforementioned borders 32-36. As can be seen, the tracks 22'-26' are arranged so that alternate tracks are formed in inclined surfaces oriented at the same magnitude angle with respect to a planar imaginary reference surface 37 parallel with surface 30', but in opposite directions. One set of surfaces 39 is oriented at an angle θ, while the other set of surfaces 41 is oriented at an angle −θ to the reference plane 37.

Figure 7:
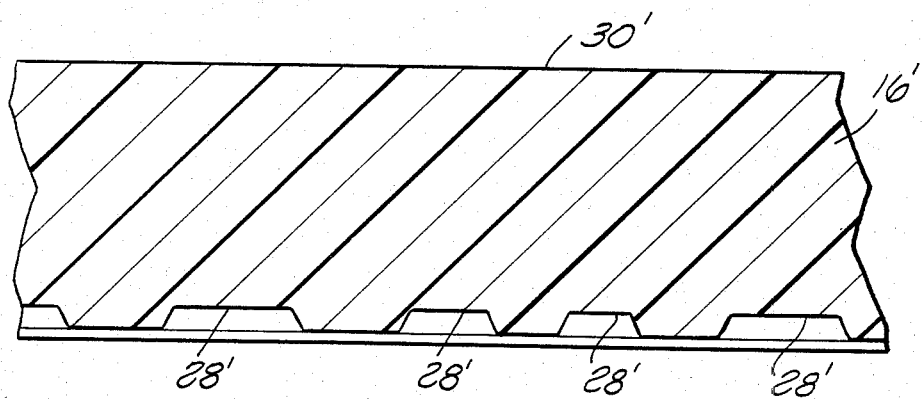
FIG. 7 is a section view through line 7—7 of FIG. 6.

FIG. 7 is a partial section view through line 7—7 of FIG. 6. As may be appreciated by an inspection of FIGS. 6 and 7, the dimensions of the indicia 28' are substantially the same as compared with the conventional disc 10.

Figure 8:
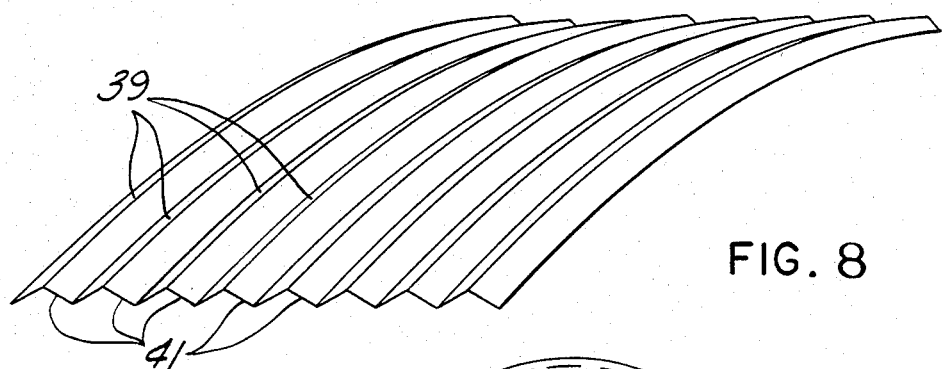
FIG. 8 is an orthogonal view of a small section of the information surface of an optical disc constructed according to the principles of the present invention.

FIG. 8 is an orthogonal view of a section of information surface 14' showing two sets of adjacent track inclined surfaces 39, 41. The curvature of the tracks has been exaggerated greatly for purposes of illustration. It will be readily appreciated from the figure that the inclined surfaces 39, 41, upon which the tracks are formed are provided in similarly inclined sets which alternate with one another.

Figure 9:
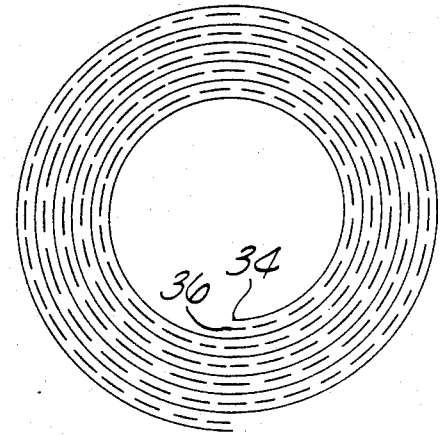
FIG. 9 is a diagram showing the pattern in which an optical disc constructed according to the principles of the present invention may be read.

The inclined surfaces 39, 41, are formed on the information surface 14' of the disc such that two separate spiraling tracks may be recorded. FIG. 9 illustrates this. In FIG. 9 the separate path for each set of tracks, corresponding to the differently inclined surfaces, is depicted by a separate spiral. Thus, the path followed by the first set of inclined surfaces 39 (FIG. 8) follows the solid line spiral track 34, while the second set of inclined surfaces 41 follows the dashed line spiral track 36. Information is stored on the disc such that first one spiral track 34 is read entirely, and then the other spiral track 36 is read, for example in the reverse direction from the first track 34. Other schemes are possible, for example alternately switching slopes of a single continuous track with each complete revolution around the track on the disc. However, the configuration shown in FIG. 9 depicting alternating interleaved separate tracks is preferred.

Figure 10A:
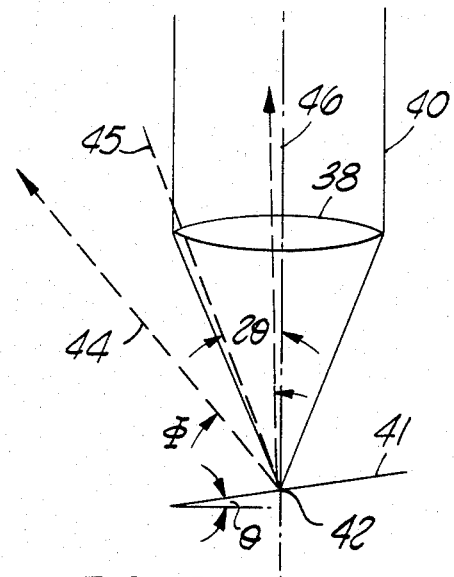
FIGS. 10A and 10B are optical diagrams illustrating the principles of operation of the present invention.
Figure 10B:
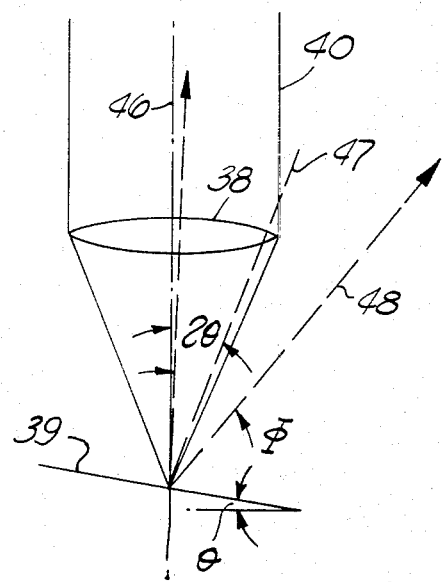

FIGS. 10A and 10B are optical diagrams which illustrate principles by which the optical disc of the preferred embodiment of the present invention can be read. An objective lens 38 images a light beam 40, for example of laser light, to a small spot 42 on a track in one of the sets of sloping surfaces 39 or 41 (FIG. 8). In FIG. 10A the spot 42 is shown impinging on a track in surface 41. The surface has been exaggerated in lateral extent for purposes of illustration. As can be seen, the imaged spot 42 of light impinges on the track of the surface 41 and is reflected and scattered back in a cone of light 44 having a central axis 45 oriented at an angle $2\theta$ with respect to the central axis 46 of the incident beam of light 40. Cone 44 of light emanating from the track extends through an angle $\theta$ which varies as a function of the track-to-track spacing. By suitable selection of the angle of incline $\theta$ and the track-to-track spacing, the disc can be designed such that the cone 44 of light is predominantly on one side of a plane which includes the central axis 46 of the incident beam of light and which extends in the direction of the track. The presently preferred embodiment has a track-to-track spacing of 1.2 microns, and an angular incline $\theta$ of 15°.

FIG. 10B is a diagram similar to that shown in FIG. 10A, showing the spot 42 of light incident on track 39, which is inclined in the opposite direction to track 41, as discussed above. The same considerations apply as discussed in connection with FIG. 10A, only the direction of the incline of the central axis 47 of cone 48 is opposite to that of cone 44, as can be seen.

It will be appreciated that by positioning separate photodetectors on either side of the aforementioned plane passing through the incident light central axis 46, effective discrimination may be obtained between the tracks by detecting only light which is incident on one of the two photodetectors and not the other, while reading a given set of tracks. Thus, assuming that track 41 is read, any light from the incident beam 40 which "spills over" to an adjacent track 39 oriented as shown in FIG. 10B, is directed generally in the direction of the cone 48 of light.

It will be noted that the cones of light 44 and 48 (FIGS. 10A and 10B, respectively) partially overlap the objective lens 38. Accordingly, in order to detect most of the light within each cone 44, 48, one pair of photodetectors should be located within the field of the objective lens 38 and another outside of the field.

FIG. 11 depicts such an arrangement of photodetectors. A first pair of photodetectors 50 and 52 is provided, such that photodetector 50 is outside of the field of the objective lens 38 while photodetector 52 is in the field, as shown. On the opposite side of a plane 49 bisecting the objective lens 38 in the direction of the tracks is another pair of photodetectors 54 and 56, with photodetector 54 being outside of the field and photodetector 56 being within the field of the objective lens 38. In detecting the light from a particular set of tracks the outputs of an associated pair of photodetectors, for example photodetectors 50 and 52, are added together, amplified and demodulated.

FIG. 12 is a diagram of an optical arrangement by which the scheme depicted in FIG. 11 may be implemented by modification of a conventional optical disc player apparatus. According to this arrangement the outer photodetectors 50, 54 (FIG. 11) are attached to the objective lens support 60, a polarizing beam splitter 62 is provided in the optical path of the incident beam 40, and a quarter wavelength plate 64 is placed in the optical path between the beam splitter 62 and the objective lens. The quarter wavelength plate 64 has the effect of rotating the polarization of the incident light beam by 90 degrees after it passes through twice, once in the incident path and once after being reflected from the disc. The returning light is thus reflected at the beam splitter 62 at right angles, as shown. The two inner photodetectors 52 and 56 are placed in the path of the deflected light, as shown.

A further advantage of splitting between two photodetectors the detection of the light returning from the angularly multiplexed disc of the present invention is that advantage may be taken of cancellation effects which serve to improve the cross-talk suppression even more. Thus, it is believed that due to interference effects the unwanted contribution of light incident on the photodetectors from adjacent tracks is additive with the desired light across a portion of its angular extent within the area being detected, and is subtractive within the remainder of its extent. Thus, for example, the unwanted component may result in an additive effect with the light detected on photodetector 52 while at the same time resulting in a subtractive effect with the light being detected on photodetector 50.

Advantage may be taken of this effect by controlling the contribution from each photodetector such that the additive and subtractive effects are made to effectively cancel.

FIG. 13 shows a circuit diagram for a circuit which implements this scheme. The output of photodetector 50 is applied to the input of an amplifier 70, the output of which is applied to one input of a summer 72. The output of photodetector 52 is applied to the input of a second, variable amplifier 74, the output of which is applied to the second input of summer 72. The output of the summer is amplified and detected to recover the information on the track being read. By adjusting the relative amplification of amplifier 74 with respect to amplifier 70 the additive component and the subtractive component of cross-talk can be balanced until they are effectively nulled.

Other arrangements may be used to read the angularly multiplexed optical disc of the present invention. For example, the incident beam of light may be inclined in one direction to read one set of tracks, and then inclined in another direction to read the other set of tracks. The angles of inclination can be selected to permit detection of the light emanating from both sets of tracks by one photodetector, or one set of photodetectors, which are fixed in the player apparatus.

It will be appreciated from the foregoing that the present invention represents a significant advance in the field of optical readable recording media, especially as applied to video program optical discs. In particular, the invention provides an improved configuration for the information surface of an optical disc which provides substantially reduced cross-talk between adjacent tracks. While several embodiments have been described, it should be understood that other modifications may be made without departing from the spirit and scope of the invention. According, the invention is not to be limited except as by the appended claims.

I claim:

1. Apparatus for reading an optically readable recording medium having a first and a second set of elongate recording surfaces inclined at different angles with respect to one another and having a first and a second set of optically readable information tracks thereon, respectively, comprising:

scanning means for scanning a projected spot of light along said first and along said second set of tracks;

a first pair of photodetectors arranged so as to detect the light from said spot which emanates from said first set of tracks, the first one of said first pair of photodetectors being positioned so as to detect a first portion of said emanative light, and the second one of said first pair being positioned so as to detect a second portion of said emanative light which is spatially distinct from said first portion;

a second pair of photodetectors arranged so as to detect the light from said spot which emanates from said second set of tracks, the first one of said second pair of photodetectors being positioned so as to detect a first portion of said emanative light from said second set of tracks, and the second one of said second pair being positioned so as to detect a second portion of said emanative light from said second set of tracks which is spatially distinct from said first portion of light from said second set of tracks;

first adjustment means for combining in controllably variable relative amounts the signals from said first and said second ones of said first pair of photodetectors; and second adjustment means for combining in controllably variable relative amounts the signals from said first and said second ones of said second pair of photodetectors, whereby additive and substractive signal contribution from adjacent tracks can be controllably combined so as to null their effect.

2. Apparatus according to claim 1 wherein said first adjustment means comprises:

a first variable gain amplifier having its input connected to one of said first pair or photodetectors, a second amplifier having its input connected to the other one of said first pair of photodetectors, and first summing means for combining the outputs of said first and second amplifiers; and wherein said second adjustment means comprises a third variable gain amplifier having its input connected to one of said second pair of photodetectors, a fourth amplifier having its input connected to the other one of said second pair of photodetectors, and second summing means for combining the output of said third and fourth amplifiers.

3. Apparatus according to claim 1 wherein said scanning means comprises;

light means for providing a beam of light;

optical means for imaging said beam of light to form said spot on said first and second set of tracks;

means for providing relative motion between said optical means and said recording medium so as to effect the scanning of said spot of light along said track 4. Apparatus according to claim 3 wherein said first ones of said two pairs of photodetectors are positioned within the field of said optical means and wherein said second ones of said two pairs of photodetectors are positioned outside the field of said optical means.

5. Apparatus according to claim 4 wherein said optical means further comprises beams splitter means in the path of said beam of light substantially passing said beam through said beam splitter means and substantially reflecting in a direction different from the central axis of said beam the light returning from said recording medium through said optical means, and wherein said first ones of said pairs of the photodetectors are positioned so as to intercept light in said different direction.

* * * * *